United States Patent [19]

Grossberndt et al.

[11] Patent Number: 5,234,301
[45] Date of Patent: Aug. 10, 1993

[54] HOLE FORMING AND SELFTAPPING SCREW

[75] Inventors: Hermann Grossberndt, Bad Laasphe; Günter Kretschmer, Siegen; Horst Klees, Breidenbach-Achenbach, all of Fed. Rep. of Germany

[73] Assignee: EJOT Eberhard Jaeger GmbH & Co., Bad Laasphe, Fed. Rep. of Germany

[21] Appl. No.: 999,584

[22] Filed: Dec. 30, 1992

Related U.S. Application Data

[63] Continuation of Ser. No. 573,221, Nov. 13, 1990, filed as PCT/EP90/00476, Mar. 23, 1990, abandoned.

[30] Foreign Application Priority Data

Mar. 23, 1989 [DE] Fed. Rep. of Germany ....... 3909725
Jul. 10, 1989 [DE] Fed. Rep. of Germany ....... 3922684

[51] Int. Cl.⁵ ............................................. F16B 25/00
[52] U.S. Cl. .................................. 411/386; 411/387; 411/426
[58] Field of Search ............... 411/387, 386, 399, 378, 411/426, 411

[56] References Cited

U.S. PATENT DOCUMENTS

| | | | |
|---|---|---|---|
| 2,479,730 | 8/1949 | Dewar | 411/387 |
| 3,094,894 | 6/1963 | Broberg | 411/387 |
| 3,156,152 | 11/1964 | Reed | 411/386 X |
| 3,438,299 | 4/1969 | Gutshall | 411/387 |
| 3,500,712 | 3/1970 | Wagner | 411/387 X |
| 3,578,762 | 5/1971 | Siebol | 411/387 |
| 3,924,508 | 12/1975 | DeCaro | 411/387 |
| 4,064,784 | 12/1977 | Adler | 411/387 |
| 4,068,554 | 1/1978 | Hirabayashi | 411/386 |
| 4,114,507 | 9/1978 | Fischer et al. | 411/387 |
| 4,179,976 | 12/1979 | Sygnator | |
| 4,369,609 | 1/1983 | Sheldon et al. | 411/387 X |
| 4,701,088 | 10/1987 | Crull | 411/369 |
| 4,749,322 | 6/1988 | Sygnator | 411/387 |

FOREIGN PATENT DOCUMENTS

| | | |
|---|---|---|
| 0338973 | 3/1989 | European Pat. Off. . |
| 2537446 | 8/1975 | Fed. Rep. of Germany . |
| 2552665 | 8/1976 | Fed. Rep. of Germany . |
| 2732695 | 8/1978 | Fed. Rep. of Germany . |
| 2802229 | 8/1978 | Fed. Rep. of Germany . |
| 2907360 | 2/1979 | Fed. Rep. of Germany . |
| 3909725 | 9/1990 | Fed. Rep. of Germany . |
| 1189384 | 10/1959 | France . |
| 1581931 | 9/1968 | France . |

OTHER PUBLICATIONS

Bostitch ASN-1, Pneumatic Screw-Nailer for Lightweight Steel Framing, 2 pp. 1988 Stanley-Bostich, Inc. East Greenwich RI 02818.

Primary Examiner—Rodney M. Lindsey
Attorney, Agent, or Firm—Banner, Birch, McKie & Beckett

[57] ABSTRACT

Hole forming and selftapping screw of up to approximately 6 mm thread diameter for tapping into sheet metal of a thickness of up to approximately 1 mm comprising a head including a formation for receiving a tool, a thread shank and a cylinder member following thereon having a diameter less than the thread-pitch diameter of the thread shank, merging into a tapered hole forming member. The thread shank merges with the cylinder member via a taper extending over approximately four threads, a distance corresponding approximately to the four-fold sheet metal thickness. The hole forming member terminates in a convexly curved friction surface corresponding to a radius (R) of approximately 0,5 mm. The entire screw is formed in one piece of tempered steel having a tensile strength of up to approximately 1400 N/mm², mechanically hardened steel respectively.

15 Claims, 3 Drawing Sheets

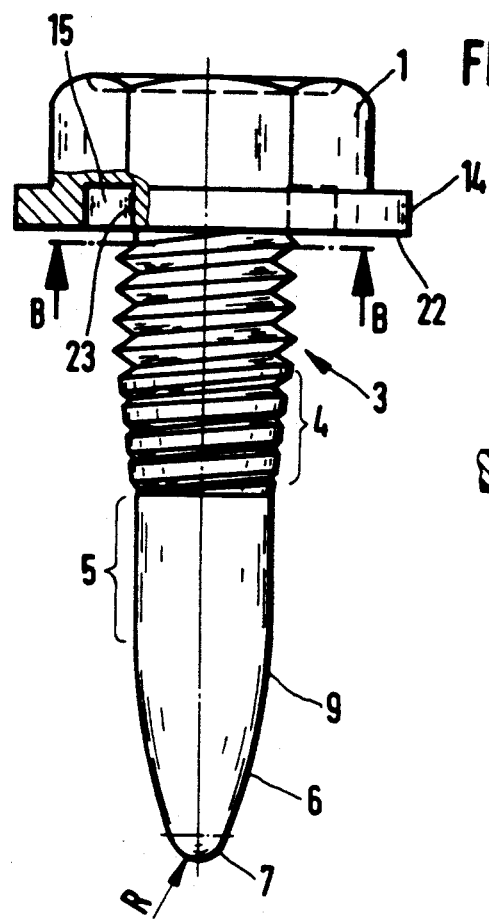
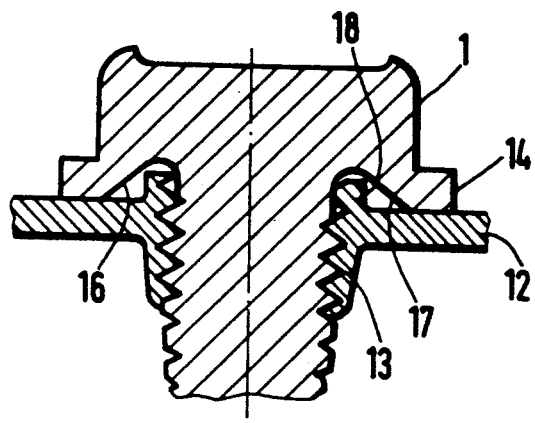
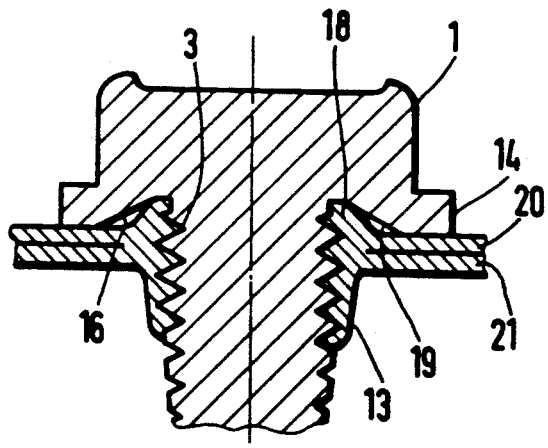
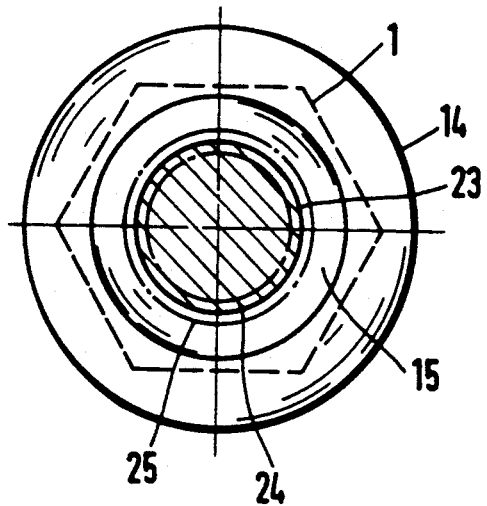

HOLE FORMING AND SELFTAPPING SCREW

This is a continuation of co-pending application Ser. No. 07/573,221, filed on Nov. 13, 1990, filed as PCT/EP90/00476, Mar. 23, 1990, now abandoned.

BACKGROUND AND SUMMARY OF THE INVENTION

The invention relates to a hole forming and selftapping screw of up to approx. 6 mm thread diameter for tapping into sheet metal of a thickness of up to approx. 1 mm comprising a head including a formation for fitting a tool, a thread shank and a cylinder member following thereon having a diameter less than the thread-pitch diameter, merging into a tapered hole forming member.

Such a screw is known from DE-PS 25 37 446. In the case of this screw denoted as a selftapping sheet metal screw, the hole forming member serves to drill the hole which will later accommodate the screw, by a chip-forming cutting action for which purpose the hole forming member terminates in a distinct point, forming the tip of a pyramid the edges of which serve for the cutting of the relevant sheet metal part. According to FIG. 18 of this patent specification a cylinder member, the diameter of which equals or is less than the thread-pitch diameter of the threads, is provided between the wholly cylindrical thread shank and the hole forming member of a pyramidal configuration. The purpose of this cylinder member is to adapt the drilled hole to the cylinder form and to adjust its axial direction vertically to the hole, thus enabling the thread shank to be inserted into the sheet metal without malalignment.

A further hole forming and selftapping screw is known from DE-PS 27 32 695. This screw is also based on the principle of first penetrating into the material of the sheet metal by means of a sharp point of its conical hole forming member and to drill a pilot hole into the sheet. The hole forming member of this screw is furthermore provided with a thread of large pitch from which during further penetration of the screw into the sheet metal a reaming of the pilot hole, initially drilled by the sharp point, is to be attained by expansion in a flaring manner. The thread of the thread shank in this screw merges directly with the hole forming member.

Various disadvantages result from the fine chipcutting of the sheet metal resulting from the tapping action of the known screws. Fine metal chips are deposited inside casings and the like, where they may, for example in the case of electrical appliances, form undesirable and dangerous contact bridges. Furthermore fine chips can only be removed with difficulty and result in undesirable corrosion, particularly in the presence of moisture or humid air.

It is the object of the invention to so design the screw described in the introduction that the chipforming problem is avoided and a particularly firm fit of the tapped screw in the sheet metal is provided.

According to the invention this is attained in that the thread shank merges with the cylinder member via a taper extending over approximately four threads, a distance corresponding approximately to the four-fold sheet metal thickness, that the hole forming member terminates in a convexly curved friction surface corresponding to a radius of curvature of approximately 0.5 mm and that the entire screw is formed in one piece of tempered steel having a tensile strength of up to approximately 1400 N/mm$^2$, respectively mechanically hardened steel.

The screw according to the invention creates the hole in the sheet metal by friction of the convexly curved friction surface against the sheet metal which is thereby heated such that the material passes into its plastic range, wherein it becomes radially yielding such that a desirable hole expansion results with material displacement to a nozzle shape. It was found in this context that with a radius of approx. 0.5 mm of the convex curvature of the friction surface a favourable centering ability, sufficiently rapid heat generation combined with high penetration velocity and good heat flow through the screw result. With further tapping of the screw its cylinder member enters into the nozzle, thereby terminating the forming of the hole with the nozzle. Now the tapered portion of the thread shank engages into the hole whereby the female thread is shaped in the hole duly assisted by the taper. The cylinder member moreover permits a gradation so to speak of the rotational speed of the screw to be tapped, because for the initial forming of the hole by friction a substantially higher rotational speed is required than for forming the thread. It is thus avoided that approximately towards the end of the hole forming process the threads of the tapered portion of the thread shank have to engage already.

The heating up of the sheet metal due to friction generated by the convexly curved friction surface depends on the force by which pressure is applied to press the friction surface against the sheet metal. The pressure required for a sufficient heating can be reduced if the sheet metal is provided with a conical depression at the locality where the hole is formed. In that case and if the taper of the cone wall is such that the area of contact of the convexly curved friction surface is limited to the region of the cone wall, the convexly curved friction surface is so designed that the latter corresponds to a radius of approximately 0,5 to 1 mm.

The processing of sheet metal usually requires an initial cutting of the latter to certain dimensions often combined with center punching for bores to be applied thereafter. Therefore, within the scope of such preparatory measures, the provision of a conical depression does not involve particular efforts, especially since the conical depression is not a perforation, involving a punching process with waste formation. Contrary to the above described case of placing the screw with its convexly curved friction surface onto the level sheet metal, the area of contact required for heating up can, due to the conical depression, be increased considerably, namely annularly in the cone wall region, whereby, as compared with applying the screw onto a level metal surface, a substantial reduction of the required pressing force of the screw against the sheet metal becomes possible. This reduction of the pressing force is also favourably influenced by increasing the radius of the convexly curved friction surface because the radius of the annular contact zone and thus its length is expanded correspondingly.

Due to this design of the screw according to the invention a particularly large release moment results because the heated nozzle at the end of the tapping process shrinks around the relatively colder thread shank. Thus a particularly desirable locking effect is attained for the tapped screw.

Tools for forming a hole in sheet metal which heat the metal by friction and due to conical shape of their front end generate a hole with nozzlelike extensions, are e.g. known from DE-AS 25 52665 and DE-AS 28 02 229. These tools comprise a spike, rapidly rotatable around its axis, the spike being placed onto the metal by way of a centering point or spike tip respectively, and the sheet metal being so plastified by the heat of friction that the conical portion of the tool following on to the point can effect an expansion of the hole up to the maximum diameter of the cone which in turn is followed by a cylindrical spike portion. It is also known from FR-PS 1 189 384 to round off the foremost region of such a cone.

The technique of these tools has up to now not been applied to hole forming and selftapping screws. The reason was apparently based on fears that the considerable heating of the tool portion contacting the metal endangers the tool and may cause its destruction. For this reason the tools which became known in practice, so-called tile drills, consist of heat-resistant materials, in particular hard metal. Such materials cannot be considered for the present type screws for cost as well as technical reasons, since they will above all be exposed to considerable tensile stresses for which hard metal in particular is not suitable. It now appears that in sheet metals, in particular steel sheet up to a thickness of 1 mm holes can be formed using a hole forming member comprising the aforesaid convexly curved friction surface, by exploiting the considerable frictional heat generated thereby, if for the screw as a whole tempered steel having a tensile strength of up to approximately 1400 N/mm$^2$, or mechanically hardended steel respectively is used. Both materials are highly suitable for use as screws due to their tensile strength. When forming the hole in the sheet metal a high frictional heat results due to the convexly curved friction surface which is not readily dissipated by the relatively thin sheet metal, causing a heat build-up in the sheet metal favouring its plastification. Because of the relatively small thickness of the sheet metal this involves practically no mechanical impairment yet of the convexly curved friction surface so that the hole is formed so rapidly that the friction surface is preserved in practice. Even if the friction surface were to be thus impaired, this would be practically of no importance for the penetration of the screw because the forming of the hole by the screw is only necessary once and the subsequent forming of the thread is effected substantially without problems.

Advantageously the hole forming member is shaped in cone-like manner. The cone, due to its geometry, takes care of a continuous material feed both in radial and axial direction.

In this context it may be desirable to reduce the friction of the cone surface against the sheet metal which is attained in that the cone comprises a plurality of symmetrically arranged flattened regions which in cross section merge with one another via conically rounded regions. The deforming of the sheet metal is thus facilitated.

The material deformation is further facilitated in that the cone and the flattened regions merge with the cylinder member via an axially rounded region. Due to the axially rounded region a uniform expansion of the material to be deformed results until the cylinder member is reached, and thus a favourable material flow. The hole forming member of the screw may thus advantageously be so designed that the cone angle averages approximately 30° to 40°.

The formation of the nozzle formed by plastic deformation permits the forming in the nozzle of female threads of a pitch substantially smaller than the usual pitch in known so-called sheet metal screws.

The screw may thus advantageously be so designed that the pitch P of the thread in relation to its outer diameter d corresponds to the formula P=0,15 to 0,20 d.

If it is desired not to crush this collar when tightening the screw, the head of the screw is advantageously so designed that the latter at its underside facing the thread shank comprises an annular groove the inner wall of which has a radius corresponding substantially to the radius of the thread flanks and which accommodates the front end of a nozzle formed during the penetration of the screw into the sheet metal, that is to say the abovementioned collar.

The crushing of the collar with a screw having a smooth underside of its screw head often results in cutting the collar to a certain extent into chips. Such metal chips are undesirable because of dirtying and subsequent corrosion, when using the screw in connection with electrical appliances, such metal chips may also lead to electrical complications, in particular short circuits.

The annular groove may be given a rectangular cross section. For this purpose the annular groove is pressed into the screw head when the screw is manufactured.

It is also possible to let the outer wall of the annular groove proceed with a slope to the outside from its base. In this case the slanted annular groove can press the collar inwardly when the latter contacts the slanted wall. This design serves particularly to press the collar against the thread for which purpose the annular groove is made of such a depth that the front end of the nozzle, when the screw is tightened, is pressed in the direction of the thread shank. This attains on the one hand a particularly good sealing between the nozzle and the thread of the screw and on the other hand also a locking of the screw resulting in a considerably higher release moment.

BRIEF DESCRIPTION OF THE DRAWINGS

An embodiment of the invention is illustrated in the figures. There are shown in FIG. 1 the screw according to the invention in a side view, FIG. 2 an enlarged section along the line A—A of FIG. 1.

FIG. 6 the screw with a rectangular annular groove with its head in side view,

FIG. 7 a section along the line B—B in FIG. 1,

FIG. 8 the screw tapped into sheet metal,

FIG. 9 the screw tapped into sheet metal with the front end of the nozzle pressed against the thread.

DETAILED DESCRIPTION OF THE PREFERRED EMBODIMENTS

Figure 1:
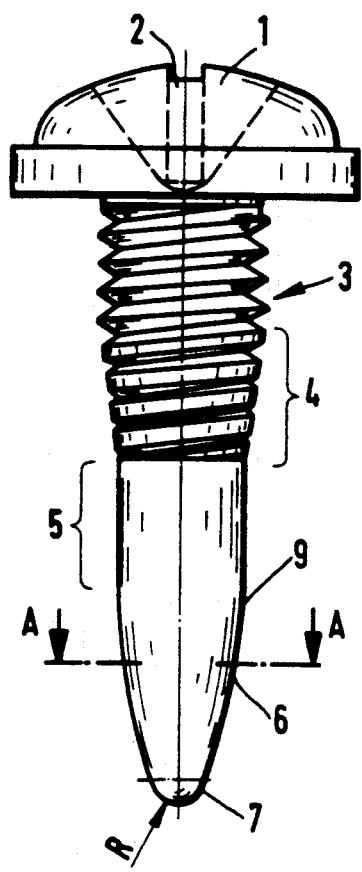

The screw shown in FIG. 1 comprises the head 1 which is in this case provided with the cross slot 2 serving as a tool receiving means. The head 1 is followed by the thread shank 3 comprising the taper 4 on its end averted from the head 1. This taper extends over four threads. Naturally it is also possible to slightly increase or decrease the number of threads. The taper results from a decrease in their outer diameter of the respective threads. The thread of the thread portion 3 is preferably rolled.

The thread shank 3 with the taper 4 is followed by the cylinder member 5, the diameter of which corresponds to the core diameter of the thread shank 3. The diameter of the cylinder member 5 can also be selected slightly larger or smaller. It should however be less than the thread pitch diameter of the thread portion 3. The axial length of the cylinder member 5 corresponds to approximately the four-fold sheet thickness assuming that the screw must be inserted into two sheets of a thickness of 1 mm each and considering further that for each sheet a nozzle is formed the length of which is also in the region of 1 mm.

The cylinder member 5 is followed by the hole forming member 6 which eventually ends in the convexly curved friction surface 7, the convex curvature of which corresponds to a radius R of approximately 0,5 mm.

It is evident from FIG. 1 that the hole forming member is of conelike configuration and merges with the cylinder member 5 via an in axially rounded region 9.

Figure 2:
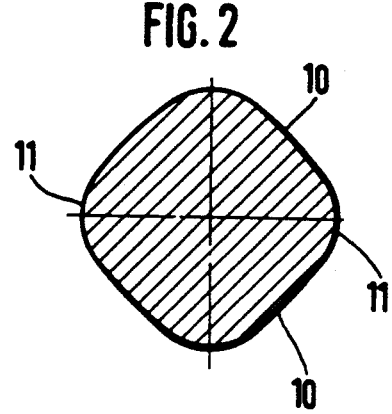

From FIG. 2 which represents a section along the line A—A of FIG. 1, it is apparent that along the hole forming member 6 four symmetrical flattend regions 10 are provided in such a manner that as compared with the flattened regions 10 more acutely rounded regions 11 result, which during the tapping of the hole forming member 6 into sheet metal 12 (in FIGS. 3 to 5) push away its material both radially and axially.

Figure 3:
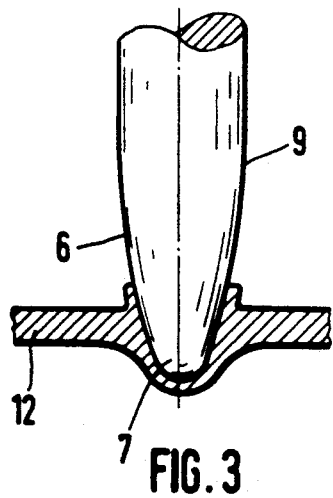
FIGS. 3, 4 and 5 individual phases of the process of tapping into sheet metal.
Figure 4:
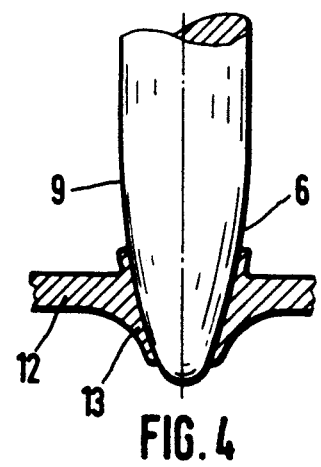
Figure 5:
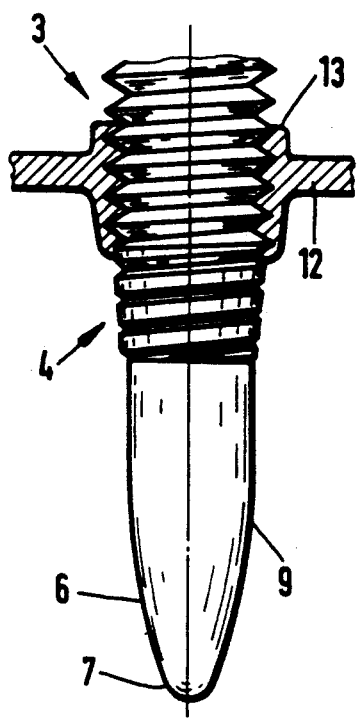

FIGS. 3, 4 and 5 serve to elucidate the tapping of the screw into sheet metal 12, e.g. steel sheet.

Firstly the hole forming member 6 with its friction surface 7 is pressed onto the sheet 12 and set into rotation at a rotational speed of approx. 4000 revolutions/min. In this context it is assumed that a metal sheet 12 of a thickness of 1 mm and a screw with a cylinder member having a diameter of 5 mm is involved. Due to the pressure of the friction surface 7 onto the sheet 12 and the high speed of rotation, such considerable frictional heat is generated between the friction surface 7 and the contact surface of the sheet 12 that the material of the sheet 12 is plastified whereby it is deflected both in the direction towards the screw and away from it and eventually, as shown in FIG. 4, forms the nozzle 13 which extends both above and below the sheet 12. In this case the cone angle of the hole forming member 6 is 35°. At this angle extensions of the nozzle 12 form above and below the sheet which differ in that the length of the extension below the sheet 12 is twice that of the extension above the sheet 12. If the cone angle is decreased, the nozzle 12 below the sheet 12 is further lengthened compared to the length above the sheet 12.

The process of plastic deformation of the sheet 12 with the nozzle 13 then progresses until the nozzle 13 has reached the cylinder member 5 where the taper 4 of the thread portion 3 then pentrates into the nozzle 13. Already in the axially rounded region 9 a strong torque increase results for the further penetration of the screw so that with a correspondingly dimensioned drive means for the tapping tool the latter reduces its rotational speed and now the taper 4 of the thread shank 3 penetrates into the nozzle 13 and grooves the latter to form the required thread. This process results in the further penetration of the thread shank 3 into the nozzle 13 (FIG. 5) until finally (not illustrated) the nozzle 13 abuts against the head 1 shown in FIG. 1. The screw is thus completely tapped into the sheet 12 with its nozzle 13. The head 1 now enters into sealing relationship with the nozzle 13 because the latter is relatively easily deformed by the underside of the head 1 and accordingly adapts to the head.

The screw shown in FIG. 6 shows the head 1 which in this context is formed as a hexagonal head. In these embodiments the head 1 comprises the collar 14 on the underside 22 of which the annular groove 15 is provided. Advantageously the annular groove 15 is pressed into the collar 14 and in this case has a rectangular cross section. The collar 14 is followed by the thread 3 onto which the further parts of the screw follow as illustrated in FIG. 6 of the main patent specification.

FIG. 7 shows a section through the screw according to FIG. 6 along the line B—B. From FIG. 7 it can be seen that the inner wall 23 of the annular groove 15 has a radius which in this case is intermediate between the radii of the thread base 24 and the thread crests 25 of the thread 3, respectively indicated in FIG. 7 each by a dotted line, therefore corresponding to the radius of the thread flanks.

FIG. 8 shows the screw with the head 1 tightened against the sheet metal 12", the front end 18 of the nozzle 13 being entirely accommodated by the annular groove 16. Thus the front end 18 is preserved when tightening the head 1 of the screw. The annular groove 16 has a wall 17 sloping to the outside from its base. This configuration of the wall 17 provides a tendency to the front end 18 to be pressed towards the inside in the direction of the thread when the front end 18 contacts the wall 17.

This effect is illustrated in FIG. 9. In the embodiment according to FIG. 9 the annular groove is not pressed so deeply into the head 1 so that the front end 18 of the nozzle 13 abuts against the sloping wall 19 when tightening the head 1, thereby being squeezed radially to the inside in the direction of the thread whereby the front end 18 firmly embraces the thread, thus creating a sealing effect and furthermore locking the screw in the nozzle 13.

The embodiment shown in FIG. 9 represents a coated metal sheet consisting of the two layers 20 and 21 which are adjacent during tapping the screw and in which, in the same manner as in the embodiment according to FIG. 8, a continuous nozzle 13 with front end 18 develops in which the materials of both layers 20 and 21 merge into each other. When forming the screw hole in superimposed metal sheets it is possible to increase the total thickness somewhat, e.g. to 1,8 mm, as compared with the thickness of a single sheet to be processed.

Figure 11:
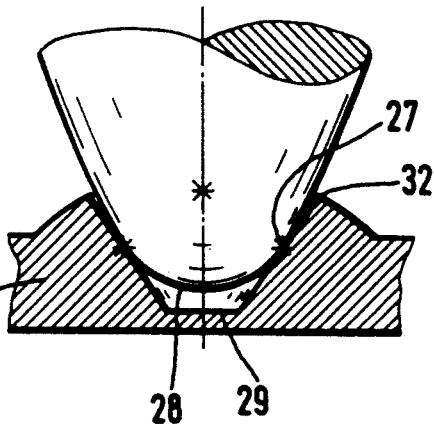
Figure 12:
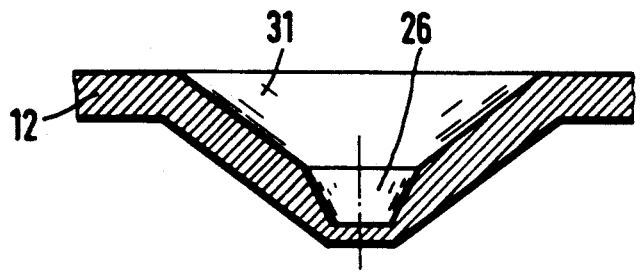

The application of the screw according to the invention in connection with its tapping into sheet metal having a conical depression will now be explained by way of FIGS. 10 to 12.

Figure 10A:
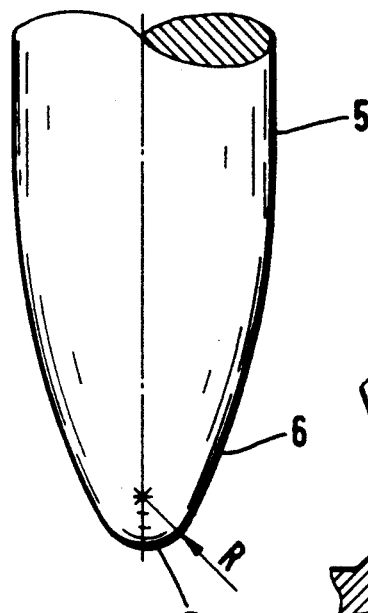
FIG. 10a and b the screw in relation to sheet metal having a conical depression, FIG. 11 the co-acting of the screw with the conical depression, FIG. 12 a conical depression provided in the centre of a depression.
Figure 10B:
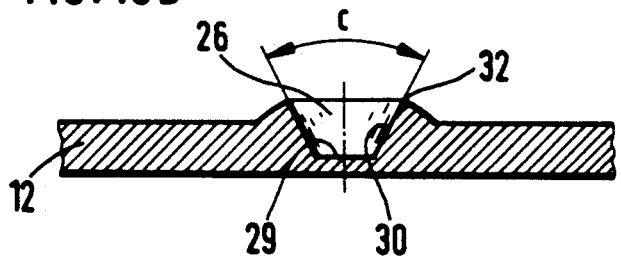

FIG. 10a shows the cylinder member 5 followed by a hole forming member 6 and the convexly curved friction surface 7 of the selftapping screw, the radius R being in the range of approximately 0,5 to 1 mm. This screw co-acts with the metal sheet 12 provided with the conical depression 26 according to FIG. 10b. The cone angle $\alpha$ of the depression 26 is 54° in this case. The convexly curved friction surface 7 is inserted into this depression 26 and then forms the contact zone 27, evident from FIG. 11, which in annular manner surrounds the convexly curved friction surface 7. The front end 28 (see FIG. 11) of the convexly curved friction surface 7 keeps a small distance from the base 29 of the depression 26 so that contact with the metal sheet 12 only exists in the region of the conical wall 30 of the depression 26, namely, according to FIG. 11, below the edge 32 of the conical wall 30. It is, however, also possible to have the convexly curved friction surface 7 placed onto the edge 32 although this is somewhat less favourable with regard to the generated friction. The pressing force acting upon the screw therefore only generates friction in the region of the contact zone 27 which, due to the considerable surface area of the contact zone 27 results in the required heating of the material of the metal sheet 12 even with relatively minor pressing forces. A screw provided with M5-thread requires a pressing force of approximately 150N in this context.

Especially in the case of small screws, e.g. with a thread of M3, the large diameter of the conical depression 26 is approximately 1 mm. A conical depression that small may perhaps be difficult to be found by the screw to be tapped into that sheet. Consequently it may be advantageous to provide the conical depression at the bottom of a recess as illustrated in FIG. 12. According to that figure the recess 31 and centrally in its base the conical depression 26 are pressed into the metal sheet 12 without perforating the metal sheet 12. A screw guided into the recess 31 will then be automatically guided into the depression 26 by the wall of the recess 31 acting in the same way as described with reference to FIG. 11.

Due to the heating of the material of the metal sheet arising via the contact zone 27 a deformation then results as described above with reference to FIGS. 3, 4 and 5.

We claim:

1. A hole forming and self-tapping screw comprising a head including a formation for receiving a tool, a threaded shank, a cylinder portion adjacent thereto having a diameter less than the thread-pitch diameter of the threaded shank and a tapered hole forming portion merging into the cylinder portion, characterized in that the threaded shank merges with the cylinder portion via a taper extending over approximately four threads, that the hole forming portion has a cone-like configuration and includes a smooth non-cutting exterior surface defined by a plurality of successive zones, one of said zones being adjacent said cylinder portion and including a series of flattened portions defined along different sides of said screw separated by rounded non-cutting transition segments, one other of said zones terminating in a convexly curved friction surface without cutting edges corresponding to a radius of curvature of approximately 0.5 mm, and that the entire screw is formed as one piece, whereby said screw enables the formation and tapping of a hole in a metal sheet without the creation of chips.

2. A screw according to claim 1, characterized in that the hole forming portion merges with the cylinder portion via an axial rounded region.

3. A screw according to claim 1, characterized in that the cone-like configuration of the hole forming portion is shaped to define an angle which averages approximately 30° to 40°.

4. A screw according to claim 1, characterized in that the pitch (P) of the thread in relation to its outer diameter (d) corresponds to the formula P=0.15 to 0.20 d.

5. A screw according to claim 1, characterized in that the head on its underside facing the threaded shank has an annular groove, the inner wall of which has a radius substantially corresponding to the radius of the thread flanks and which accommodates the front of a nozzle formed during the penetration of the screw into a sheet of metal.

6. A screw according to claim 5, characterized in that the annular groove has a rectangular cross section.

7. A screw according to claim 5, characterized in that the outer wall of the annular groove slopes to the outside from its base.

8. A screw according to claim 7, characterized in that the annular groove (6) has such a depth that the front end of the nozzle when the screw is tightened, is pressed inwardly towards the threaded shank.

9. A hole forming and self-tapping screw comprising:
means for engaging a tool for rotating the screw;
a threaded shank portion for tapping a hole defined in a sheet of metal and securing said screw in the hole;
a cylindrical portion, adjacent said threaded portion, having a generally smooth non-cutting exterior surface; and
a hole forming portion adjacent said cylinder portion for forming a hole in sheet metal without the formation of chips, said hole forming portion being diametrically no larger than said cylinder portion and having an exterior surface devoid of cutting edges, said hole forming portion having a generally cone-shaped segment including a plurality of spaced apart flattened panels defined on different sides of the screw and joined by a plurality rounded corner portions, and said hole forming portion further having a generally uniform rounded end defining a convexly curved friction surface, said hole forming portion being adapted to plasticize a portion of the sheet metal to form the hole without the creation of chips.

10. A screw according to claim 9, in which said rounded end of said hole forming portion is defined with a radius of curvature within the range of about 0.5 to 1.0 mm.

11. A screw according to claim 9, further including a head defining an underside, said underside of said head being fixed to said threaded shank portion, and said head further defining an annular groove on the underside of said head.

12. A screw according to claim 11, wherein said annular groove has a generally rectangular cross section.

13. A screw according to claim 11, wherein said annular groove includes an inner wall which tapers toward said underside of said head as it extends outward from said shank.

14. A hole forming and self-tapping screw comprising:
means for engaging a tool for rotating said screw;
a threaded shank portion for tapping a hole defined in a sheet of metal and securing said screw in the hole; and
a non-threaded shank portion having a smooth, non-cutting, generally continuous exterior surface and including a generally cylindrical segment formed of a first diameter adjacent said threaded shank portion, a generally cone shaped segment adjacent said cylindrical segment and a rounded non-cutting end adjacent a remote end of said cone-shaped segment, said cone-shaped segment and said rounded non-cutting end having no portion with a diameter greater than said first diameter, said non-threaded portion having the capacity to plasticize a portion of the sheet metal to thereby form a hole in a sheet of metal without creating metal chips.

15. A screw according to claim 14 wherein said cone-shaped segment includes a plurality of flattened regions symmetrically positioned around the longitudinal axis of the shank and a plurality of rounded regions interconnecting adjacent flattened regions.

* * * * *